(12) United States Patent
Keith et al.

(10) Patent No.: US 6,393,346 B1
(45) Date of Patent: May 21, 2002

(54) METHOD OF MONITORING VEHICULAR MILEAGE

(75) Inventors: W. Curtis Keith, Valrico; Paul H. Evans, Dunedin, both of FL (US)

(73) Assignee: CompuTracker Corporation, Valrico, FL (US)

( * ) Notice: Subject to any disclaimer, the term of this patent is extended or adjusted under 35 U.S.C. 154(b) by 0 days.

(21) Appl. No.: 09/522,555

(22) Filed: Mar. 10, 2000

Related U.S. Application Data

(63) Continuation of application No. 09/014,483, filed on Jan. 27, 1998, now Pat. No. 6,115,655.

(51) Int. Cl.$^7$ .......................... G06F 165/00; G06F 7/00
(52) U.S. Cl. ......................... 701/35; 701/207; 701/208; 701/214; 340/438; 340/988; 342/357.01; 342/357.06
(58) Field of Search ..................... 701/35, 209, 210, 701/211, 201, 214, 207, 208; 340/990, 988, 438; 342/357.01, 357.06

(56) References Cited

U.S. PATENT DOCUMENTS

| | | | |
|---|---|---|---|
| 4,258,421 A | 3/1981 | Juhasz et al. | 342/357.13 |
| 5,014,206 A | 5/1991 | Scribner et al. | 701/213 |
| 5,068,656 A | 11/1991 | Sutherland | 701/35 |
| 5,231,584 A | 7/1993 | Nimura et al. | 342/357.06 |
| 5,428,542 A | 6/1995 | Liesveld | 340/789 |
| 5,532,690 A | 7/1996 | Hertel | 701/35 |
| 5,543,802 A | 8/1996 | Villevielle et al. | 701/202 |
| 5,612,875 A | 3/1997 | Haendel et al. | 340/989 |
| 5,808,565 A | * 9/1998 | Matta et al. | 340/994 |
| 5,852,790 A | 12/1998 | Hayes et al. | 701/207 |
| 5,928,291 A | * 7/1999 | Jenkins et al. | 701/1 |
| 5,938,721 A | * 8/1999 | Dussell et al. | 701/211 |
| 5,954,773 A | * 9/1999 | Luper | 701/35 |
| 5,964,821 A | * 10/1999 | Brunts et al. | 701/201 |
| 5,974,356 A | * 10/1999 | Doyle et al. | 701/209 |
| 5,987,381 A | * 11/1999 | Oshizawa | 701/209 |
| 6,084,542 A | 7/2000 | Wright et al. | 701/35 |

\* cited by examiner

Primary Examiner—William A. Cuchlinski, Jr.
Assistant Examiner—Tuan C To
(74) Attorney, Agent, or Firm—Price and Gess

(57) ABSTRACT

A navigational system and a computer-based datalogger are used to store data on the distances traveled by and places visited by a monitored vehicle. The datalogger includes a clock and an on-board memory that can store time-stamped records of the latitude and longitude of places visited by the vehicle. In some such systems the vehicle operator can assign a label or a location classification to selected places that he or she visits. Additionally, in some versions of the system an administrator can use a central computer located at the vehicle's home base to assign labels to locations where the vehicle is expected to make a stop. The central computer generates a map-like graphical output that displays a point corresponding to each of the places visited. This display may also show the time spent at each place visited during an operational period.

6 Claims, 5 Drawing Sheets

| time | Lat | Long | Remark | Flag |
|---|---|---|---|---|
| 10:11 | 28:01:17 | 82:29:23 | | |
| 10:12 | 28:01:38 | 82:29:24 | sub shop | |
| 10:13 | 28:01:37 | 82:29:07 | | √ |
| 10:14 | 28:01:38 | 82:28:70 | | √ |
| 10:15 | 28:01:38 | 82:28:70 | | √ |
| 10:16 | 28:01:38 | 82:28:70 | | √ |
| ″ | ″ | ″ | | √ |
| ″ | ″ | ″ | | √ |
| 10:43 | 28:01:38 | 82:28:70 | | √ |
| 10:44 | 28:01:55 | 82:28:70 | | √ |
| 10:45 | 28:01:55 | 82:28:95 | | √ |

*FIG. 5*

METHOD OF MONITORING VEHICULAR MILEAGE

CROSS REFERENCE TO RELATED APPLICATIONS

This application is a continuation of U.S. application Ser. No. 09/014,483, filed Jan. 27, 1998 now U.S. Pat. No. 6,115,655.

BACKGROUND OF THE INVENTION

1. Field of the Invention

The invention relates to data processing systems employing a satellite navigation system, such as the Global Positioning System (GPS) for tracking places traveled to and distances traveled between a plurality of way points or destinations.

2. Description of Prior Art

In U.S. Pat. No. 4,258,421 granted to Juhasz et al., a vehicle monitoring system is disclosed that comprises a data processing unit for receiving and processing data relevant to the operation of the vehicle, storage means for storing the data, a portable data link for exacting the data from the vehicle and a remote computer for analyzing the data and for providing print-outs for record keeping, maintenance and diagnostic purposes.

In U.S. Pat. No. 5,041,206 granted to Scribner et al. a vehicle tracking system is disclosed in which the position of a vehicle is measured on the occurrence of a predetermined event by receiving a transmission from a navigational transmitter (e.g., a GPS satellite), and the position data is stored in an on-board data collector for subsequent retrieval.

In U.S. Pat. No. 5,068,656 granted to Sutherland a system for monitoring and recording out-of-route mileage for long-haul trucks is disclosed. This system uses two-way radio communication between a central office and the vehicle and uses on-board datalogging equipment of the sort that can report on vehicle activity after the vehicle returns to its base.

In U.S. Pat. No. 5,231,584 granted to Nimura et al. a vehicular navigation system employing manually designated start and end points is disclosed, which uses the end point of one segment of a trip as the start point of the next.

In U.S. Pat. No. 5,428,542 granted to Liesveld a system for recording the distance traveled by a vehicle for tax-reporting purposes is disclosed. Lisveld's system provides audible prompting messages to the vehicle operator on the occurrence of a predetermined event (e.g., turning the vehicle's ignition switch on or off) and records the operator's spoken response, which comprise the odometer reading and the current time.

In U.S. Pat. No. 5,532,690 granted to Hertel a system for monitoring a vehicle moving within a designated area is disclosed the system also determines when the vehicle leaves the area.

In U.S. Pat. No. 5,543,802 granted to Villevielle et al. a GPS system that stores way points in sequence so that a return route can be calculated is disclosed. The system provides for manually entered way points.

In U.S. Pat. No. 5,612,875 granted to Haendel et al. a system for measuring distance traveled within a predetermined area, such as a state is disclosed. This system stores the entire boundary of a state in memory and measures miles traveled within that state so that a truck's license fees can be properly apportioned.

OBJECTS AND SUMMARY OF THE INVENTION

The present invention provides a system and method for recording the distances traveled and the places visited by a monitored vehicle equipped with a navigational receiver and a computer-based datalogger having a clock and an on-board memory so that the datalogger can store time-stamped records of the latitude and longitude of places or destinations visited by the vehicle. In some embodiments of the invention an input means is provided for the vehicle operator so that he or she can assign a label or way point identifier to each one of the destination visited. Additionally, in other embodiments an administrator can use a central computer located at the vehicle's home base to assign labels to predetermined locations to be visited by the vehicle. Means are provided for communicating the set of time-stamped records from the vehicle to the central computer as well as communicating any administratively assigned labels from the central computer to the on-board datalogger. The central computer operates under software control to generate a map-like graphical output displaying a point corresponding to each of the destinations by by the vehicle visited. In a preferred embodiment the computer also displays the time spent at each destination during an operational period. An operational period begins when the vehicle leaves the home base and ends when the vehicle returns to the home base. A preferred display includes means of visually distinguishing between labeled and unlabeled destinations.

It is an object of the invention to provide a method of recording and accumulating the total number of miles traveled for business purposes during a predetermined operational period. In accordance with the preferred method the vehicle operator labels each destination that is visited for business purposes. Thereafter, the central computer calculates the distance in miles between destinations visited for business purposes and between any one of the destinations visited for business purposes and the home base, and identifies these as trips of a first type.

It is a further object of the invention to provide a method of monitoring the time spent at any one of the visited destinations, or, alternatively, at each of a plurality of destinations visited during an operational period. It is a specific object of the invention to provide a method that can serve as a time clock for use in billing time spent at a customer's location. It is also an object of the invention to provide a method of monitoring the time spent at unlabeled destinations so as to generate an exception report usable by management to account for time spent at non-business purpose places and to indicate possible use of the monitored vehicle for other than business purpose, or assigned tasks.

It is yet a further object of the invention to provide a means of measuring the total distance traveled by a monitored vehicle and communicating that measurement to a central administrator responsible for distance-based scheduled maintenance of the vehicle. It is an additional specific object to use the measured distance and elapsed time to determine an average speed of the vehicle during a monitored interval.

DESCRIPTION OF THE DRAWING

FIG. 5 is a tabular presentation of some of the data displayed in FIG. 4

DETAILED DESCRIPTION OF THE PREFERRED EMBODIMENTS

Figure 1:
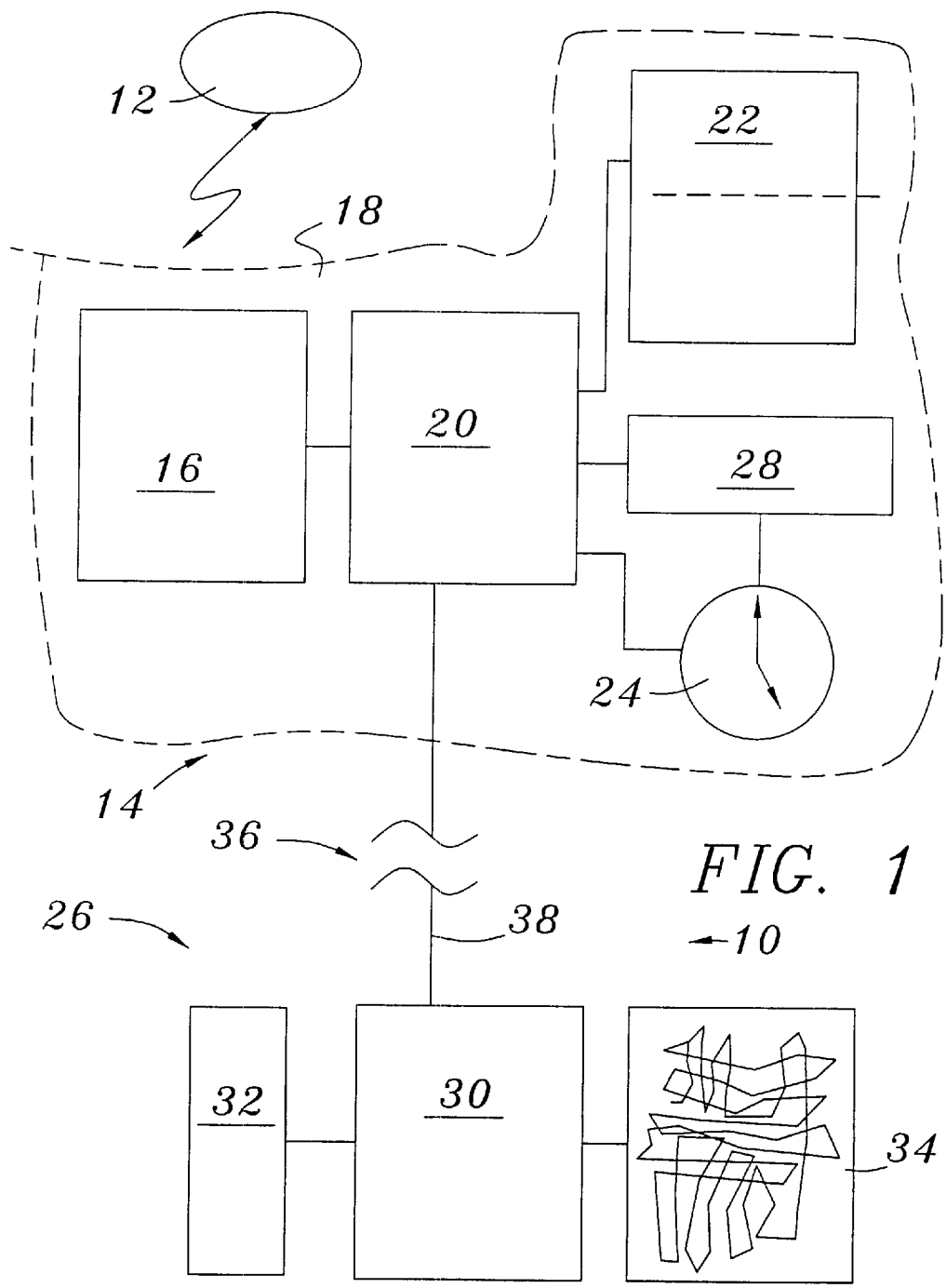
FIG. 1 is a schematic block diagram of a system of the invention.

A system of the invention 10 comprises a navigational transmitter or transmitters 12, which are preferably satellites comprising a portion of the Global Positioning System (GPS), but which may also be LORAN transmitters, local low power radio transmitters or the like. Signals, which commonly comprise both a positional and a temporal component, are received and stored by the on-board portion 14 of the system 10. A monitored vehicle 18 carries the on-board portion 14, which is preferably adapted to include a navigational receiver 16 made by either the Trimble Company or by the JRC Corporation. An output from the receiver 16 is supplied to an on-board computer 20 (which preferably comprises an Intel Model 80C186 microprocessor) having on-board memory 22, a manual input means 28 and optional timekeeping means 24 operatively associated therewith. It may be noted that in the preferred embodiment, in which the GPS navigational system is used, the system can rely on the time code portion of the GPS signal when generating one of the time-stamped records of latitude and longitude stored in the log file. In this case, the time-keeping means 24, while conventionally a portion of commercially available computer motherboards that may be selected for the on-board computer 20, is not necessarily involved in the routine data collection process. On the other had, if the system uses a different navigational system that does not provide a time code, then the separate time-keeping means is necessary. The manual input means 28 of the preferred embodiment may comprise a keyboard or keypad (if detailed labels are to be supplied by an operator, as disclosed hereinafter).and a dump button (used during off-loading of data as will be hereinafter disclosed). Alternately, the manual input means 28 may comprise a dump switch and a separate way point indication button used to designate a visited site without providing detailed information associated therewith.

Another portion 26 of the system 10, hereinafter referred to as the fixed base portion, is commonly located at a garage, motor pool or other home base of the monitored vehicle's 18 operations. The fixed base portion 26 comprises a base computer 30 (which is preferably one of many desktop computers of the type commonly referred to as "Wintel" that run under a version of the Windows® operating system supplied by the Microsoft Corporation). The base computer 30, as is conventional in the art, has a non-volatile memory 32 operatively associated therewith, and supplies an output to a graphical display device 34, which is preferably a laser printer communicating with the base computer 30 according to the widely used HP Laserjet III protocol, but which may be any of wide range of devices suitable for performing the functions hereinafter described.

A communication means 36 is provided for transferring data and instructions between the on-board 14 and base 26 portions of the system 10. In a preferred embodiment, the communication means 36 may comprise a cable 38 temporarily connecting a serial port portion of the on-board computer 20 with a serial port portion of the base computer 30 only at those times when data transfer is to occur—e.g., when the monitored vehicle 18 is parked at the fixed base. Other communication means known in the vehicle monitoring arts may also be used. These include, wireless communication, such as by, transmission of radio waves or pulsed visible light or near-infra-red beams from fixed base and on-board transceivers, and the physical transfer of a data bearing record between the two portions of the system.

Figure 2:
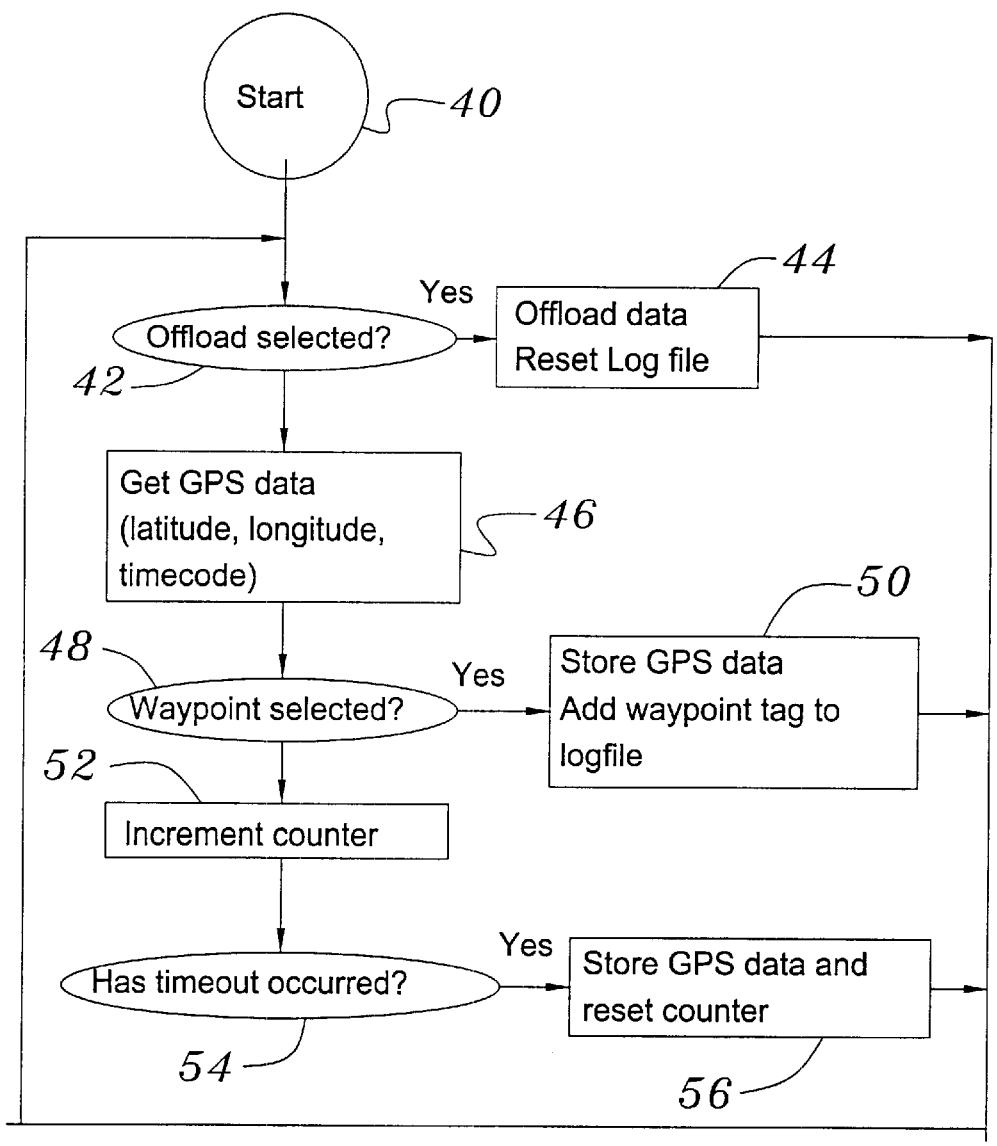
FIG. 2 is a flow chart showing processes carried out by the on-board datalogger portion of the system.

An overview of the operation of the on-board portion 14 of the system is schematically depicted in the flow chart of FIG. 2. After a start and initialization step 40 an endless loop operation begins by checking to see (Step 42) if data is to be communicated to the base computer 30. If so, the data is uploaded and the log file is reset in Step 44. The log file, stored in the on-board memory, contains a plurality of time-stamped records. In a preferred embodiment, at least two types of time-stamped records are stored in the log file. A first, location record comprises location data (e.g., latitude and longitude) and the time at which the location data was collected. As is well known in the navigation systems art, a sequential collection of records of this sort can be collected at regular time intervals, or regular distances along the path of travel (e.g., as determined from an odometer), and can be used to calculate the route followed by the vehicle 18. A second, record comprises a waypoint along with the location data destination for the vehicle, i.e., a business stop, and the time at which that identifier was stored. The record may includes also additional manually input textual data that the operator of the monitored vehicle wishes to have associated with that visit to that destination. It will be understood that a destination record could also include location data, if desired. If the location records provide a fine enough temporal or spatial resolution, the location data may be omitted from the destination records and the location data in the location records used instead.

It will be understood by those skilled in the data collection arts that program updates and the like may be supplied by the base computer to the on-board computer at the time of uploading. In the interest of clarity of presentation, this is omitted from the depiction of FIG. 2. Moreover, it will be recognized that resetting the log file is a matter of convenience and that other approaches (e.g., providing a fixed memory capacity for data in the log file and discarding the oldest data present as required to prevent overflow, and also tracking, in the base computer, the timestamp of the newest datum previously retrieved from the log file) are well known in the art of periodically collecting time-stamped data from a repository thereof.

If the on-board computer 20 is not being commanded to upload data, it receives input from the navigational receiver 16 (Step 46) and then checks (in Step 48) to see if the operator of the monitored vehicle is indicating by the manual input means 28, that the vehicle is at a way point destination which is expected to usually be a location at which some sort of business dealing (e.g., a sales call or a product delivery) is to occur a trip of a first type. If so, the time-stamped location data and the waypoint identifier data are stored in the log file. If not, a counter is incremented (Step 52) and a time-out value is checked (in Step 54) to see if a maximum predetermined interval between data collection instants has been attained. If a predetermined data collection interval has expired, then the location data is stored (Step 56) in the log file and the interval counter is reset. It will be recognized that this process of collecting data when a predetermined event occurs, or, alternately after a predetermined interval during which no predetermined event occurs is well known in the art, and that although the preceding explanation invokes a "counter" this function is conventionally provided by software programs running in the on-board computer. As will be hereinafter disclosed with particular reference to a use of the system of the invention to monitoring performance of a vehicle operating on a fixed route (e.g., a municipal bus), the manual input means 28 may be removed from the vehicle subsequent to an initial trip in which identifier data was entered.

Figure 3:
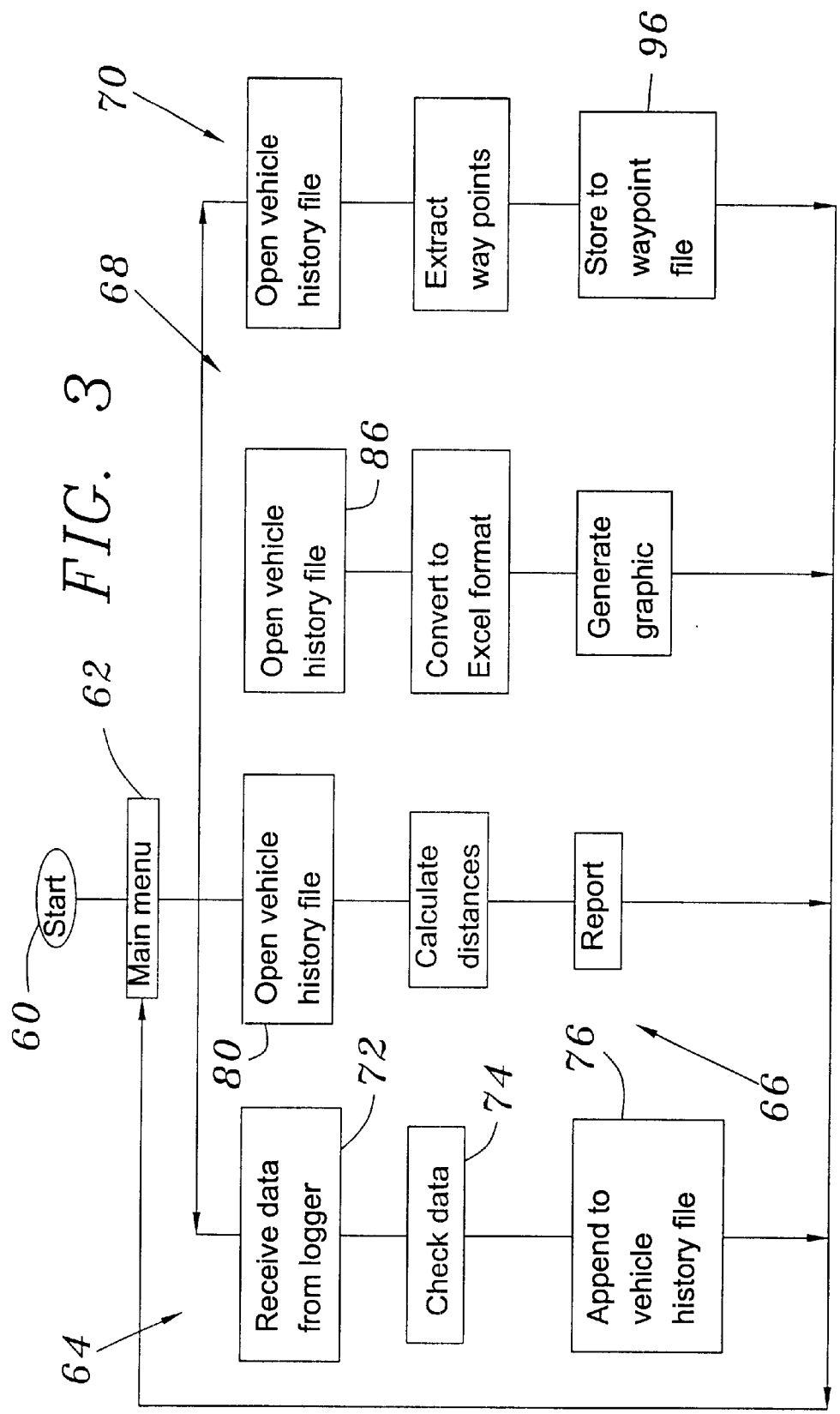
FIG. 3 is an overall flow chart showing processes carried out by the fixed base portion of the system.

The data from the monitored vehicle 18 (or from a plurality of monitored vehicles if the system 10 is used in a fleet operation) are processed by a base computer 30 generally in accordance with the flowchart depicted in FIG. 3. After the computer is started (Step 60) a main menu (62) for the vehicle monitoring system is selected by the base computer user (it is expected that other data and word processing operations may be conducted on the same computer, and that the bundle of operations herein described will be manually selected). From the main menu 62 the base computer user may select one of several principal processes 64, 66, 68, 70. In an initial data collection process 64 the data is received from the on-board computer (Step 72), checked for errors (Step 74) and appended to an appropriate vehicle history file (Step 76). One such vehicle history file is maintained for each monitored vehicle, and generally contains the data found in the corresponding on-board log file, as well as earlier historical data. In an embodiment of the system in which a vehicle operator may enter additional data pertaining to a given visit to a customer (e.g., a sales call report), that additional data may be stored separately so that the vehicle history file would contain historical data from which it could be determined when and how frequently the salesman visited that customer, but would not contain the call report data which would be processed by other means.

A distance traveled process 66 opens the vehicle history file (Step 80) and calculates the distance between points at which the monitored vehicle's latitude and longitude were stored. As is known in the navigational system arts, the degree to which this calculation of an "as the crow flies" distance accurately represents the distance actually traveled by the monitored vehicle moving over established roads depends on the time between samples—e.g., on the length of the predetermined interval after which GPS data is logged if there has been no waypoint identifier entered. Making this interval smaller improves the accuracy of the approximation at the cost of additional computer storage, longer data communication times and increased data processing time in the base computer. Both the distance calculations and the tradeoffs are well known in the art It will be understood that the average speed at which the monitored vehicle traveled in going from one destination point to the next sequential destination point can be determined from the calculated distance and the difference in the times at which the respective longitude and latitude data was stored.

A preferred system of the invention employs a graphic generation process 68 to provide either the vehicle operator or a vehicle administrator with a map-like historical presentation of the history of the monitored vehicle's travels during a predetermined period (e.g., a day's operation, or a one-month reporting period). In a preferred approach to carrying out this process the vehicle history file is opened (Step 86) and the data is imported into a spreadsheet program having a graphical output capability. In a preferred arrangement, Microsoft Corporation's Excel® spreadsheet (version 6.0 or higher) is used.

An important application of the system of the invention is that of recording the distance traveled by a vehicle for tax-reporting purposes. This can be of particular concern in cases where the vehicle in question is a private automobile that is used partly for business use and partly for the personal use of its owner and driver. In this case the owner of the vehicle must commonly provide documentation to the tax collecting authorities as to the distance driven for business purposes, and must provide a clear distinction between a trip made for business and trips made for other purposes. In a method of recording business distance traveled, a small business owner who made repeated business trips among a plurality of client locations and who also used his vehicle for personal use would initially identify his or her home base location to the measurement system. Subsequently, he or she would use the input means 28 (which in this case could be a simple momentary contact push-button switch) to designate that a given location at which the vehicle stopped for greater than a predetermined minimum interval was a place at which business was transacted (e.g. a customer's premises) and was one terminus of a business trip, or a trip of a first type. Locations where the monitored vehicle stopped (e.g., when the engine was turned off, or when a separate speed sensor (not shown) indicated a stop, or when a plurality of navigational fixes indicated that the vehicle had remained at the same location for some predetermined interval), but at which the designation button was not actuated would, of course, also be available from the log file and indicate a trip of a second type. For example, if a ignition sensor is used by the system a "stop record", can be written into the log file. In what is expected to be the more common situation, in which no separate stop-indicating sensor is employed, a sequence of location records associated with the same location (within the precision of the system) would be indicative of a non-waypoint stop. On returning to the home base the user could employ the base computer to generate a graphical display from the vehicle history file, as explained above, and could then manually label the ones of the heretofore unidentified designated sites that were visited for business purposes as trips of the first type. At the end of a reporting period (e.g., weekly or monthly) the distance-traveled algorithm 66 would be invoked to identify all business trips or trips of a first type (i.e., those having a designated waypoint as one terminus and either a second designated terminus or the fixed base as the other terminus), calculate the distance for each such trip, and accumulate and report the total distance traveled for business purposes.

In another important use of the invention, either or both of a time-clock function and out-of-route stop monitoring can be performed by an administrator who may or may not be a vehicle operator (e.g., the owner of a small business that has one ore more employee-operated service vehicles making calls at customer-specific locations). Because the time at which the monitored vehicle stops at a location and the time at which it leaves are both known the base computer can calculate the time spent at the location from the vehicle history file. Thus, the billable time spent at customer service location (e.g., by an air conditioning repair technician) can be reported by the system and used as either an accuracy check on manually entered time records kept by the employees involved or as a primary means of accumulating billable time to a customer during a billing period. Moreover, because the system informs the administrator of all stopping periods regardless of whether they have been labeled or not, the administrator can discover and investigate out-of-route or trips of a second type made by the monitored vehicle. For example, a pest control company could use the system of the invention to identify an employee's unauthorized use of the company's vehicle and supplies in a sideline business in which the employee pocketed all the unreported revenues.

Figure 4:
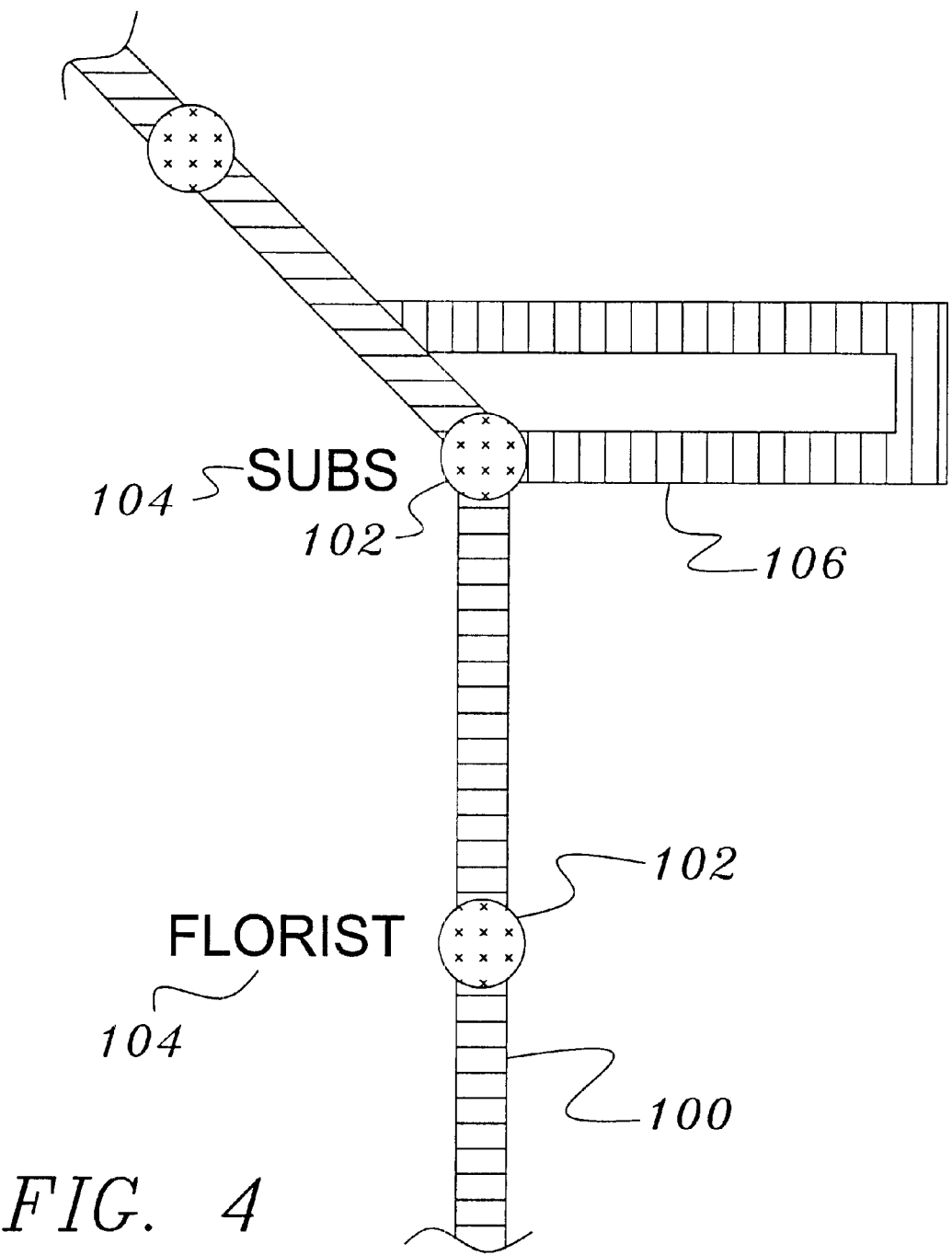
FIG. 4 is a map-like display of a monitored vehicle's travel history wherein some visited destinations are labeled and others are not.

Turn now to FIGS. 4 and 5 for an example of a use of the system of the invention to track a vehicle that is expected to travel along a predetermined route 100 according to a preset schedule. In an initial, calibrating, run along the route 100 the on-board computer 20 is equipped with a keyboard that a trusted supervisor uses to denote waypoints 102 (which may be locations where the vehicle is to stop, or which may be intervening points if there is a long distance between two adjacent stops) and to supply each waypoint with a mnemonic identifier label 104. On returning to the home base, the calibration data are transferred to the base computer 30 and the measured time between stops or waypoints may be then used to generate a list of minimum and maximum expected durations for each part of the route 100. On subsequent trips the manual input means 28 is removed from the on-board portion 14 of the system, and each such trip results in the accumulation of an on-board data file of time-stamped latitudes and longitudes (e.g., as shown in the three columns on the left of FIG. 5). At the conclusion of each trip the respective data file is transferred to the base computer 30 where the data is analyzed. In a first pass analysis, for example, one can elect to display the standard route in one color (e.g., blue) and display a locus of points that are off the route 106 in another color (e.g., red), to flag all the off-route points, and to copy the flared points into another file for additional analysis—e.g., a search within the file of flagged data for unauthorized off-route stops as indicated in FIG. 5 for the data covering an interval from 10:16 to 10:43.

Data collected from a vehicle may also be displayed on a map. In one approach to this, the system can be configured to read the collection of time-stamped position data into existing GPS mapping software at a speed that is about fifty to sixty times faster than the actual data collection time (e.g., one point per second instead of one per minute). This approach, which requires map data stored on a CD-ROM or other high capacity storage medium, is desirable if considerable detail is needed or if various levels of detail are to be displayed during the analysis (e.g., zooming into a selected portion of the map). In other cases where repeated analyses are to be done on a single map, other map-overlay approaches (e.g., using Excel® to display the single map as "wallpaper" with two fixed data points tied to points on the map) can allow for operation with relaxed requirements for data storage capacity.

Time-clock and out-of-route stop monitoring operations are most likely to be carried out when more than one vehicle is being monitored. Moreover, operations of this sort may be carried out to ensure that each operator of a company vehicle complies with the management policies and directives of the company. Because the presence of a monitoring device in or on a company vehicle is expected to be known to the operator and to be present for a well known monitoring purpose, it is expected that the mere presence of the on-board monitoring unit will be adequate in many circumstances to remind the employees of what things are to be or not be done. Therefore, it is expected that in some cases a monitoring system comprising the systems and methods hereinbefore disclosed may also comprise one or more dummy on-board units having the outward appearance of a genuine unit.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A method of monitoring a trip traveled by a vehicle having a base computer from a fixed base to a plurality of destinations, the vehicle carrying monitoring equipment that includes a navigational receiver for receiving location data identifying the location of the vehicle, and means for storing data, including the received location data and the time it was received, in a log file, the method comprising the steps of:

(a) driving the vehicle away from the fixed base:

(b) inputting a waypoint identifier representing a destination into the monitoring equipment;

(c) storing the waypoint identifier, the location data received at the time the waypoint identifier was inputted, and the time the location data was received in the log file as a record;

(d) starting a clock at the time location data is received;

(e) storing the received location data and the time it was received in the log file as a record, after the clock has run for a predetermined time period without input of a waypoint identifier;

(f) using the stored log records to calculate a sequence of destinations at which the vehicle stopped for longer than a predetermined minimum time interval and calculate the corresponding distances between the sequential destinations.

2. The method of claim 1, further comprising, after step (f), the step of (g) using the stored log records to identifier associated therewith, or the distance between two destinations having waypoint identifier associated therewith, or the distance between tow destinations having waypoint identifiers associated therewith, as a trip of a first type.

3. The method of claim 1, further comprising, after step (f), the steps of:

(g) using the stored log records to identify each distance between the fixed base and a destination having a waypoint identifier associated therewith, or the distance between two destinations having waypoint identifiers associated therewith, as a trip of a first type;

(h) using the stored log records to identify each distance between the fixed base and a destination not having a waypoint identifier, or the distance between two destinations wherein one of them does not have a waypoint identifier, as a trip of a second type;

(i) generating a graphic representation depicting each of the trips of the first type in a first fashion, and each of the trips of the second type in a second fashion.

4. The method of claim 3 wherein the first fashion graphical representation comprises a line having a first color and the second fashion graphical representation comprises a line having a second different color.

5. The method of claim 1 further comprising the step of calculating the amount of time that exceeded the predetermined time period the vehicle was at each of the destinations having waypoint identifiers.

6. The method of claim 1 further comprising the step of storing textural data inputted into the monitoring equipment.

* * * * *